(12) United States Patent
Spinger et al.

(10) Patent No.: US 12,352,423 B2
(45) Date of Patent: Jul. 8, 2025

(54) CLUSTER OF LIGHTING DEVICES, DISPLAY AND METHOD OF MANUFACTURE

(71) Applicant: LUMILEDS LLC, San Jose, CA (US)

(72) Inventors: Benno Spinger, Aachen (DE); Dirk Vanderhaeghen, Wilrijk (BE); Marc Droegeler, Aachen (DE); Floris Maria Hermansz Crompvoets, Bunde (NL); Thorsten Anger, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 18/189,431

(22) Filed: Mar. 24, 2023

(65) Prior Publication Data
US 2023/0304644 A1 Sep. 28, 2023

Related U.S. Application Data

(60) Provisional application No. 63/323,739, filed on Mar. 25, 2022.

(51) Int. Cl.
*F21V 3/00* (2015.01)
*B60R 11/00* (2006.01)
*B60R 11/02* (2006.01)

(52) U.S. Cl.
CPC ........... *F21V 3/00* (2013.01); *B60R 2011/004* (2013.01); *B60R 11/0235* (2013.01)

(58) Field of Classification Search
CPC .......... B60R 11/0235; B60R 2011/004; B60Q 1/0088; B60Q 2400/30; B60Q 1/2661; B60Q 1/2696; B60Q 1/28; B60Q 1/5035; F21V 3/00; F21S 43/14; F21S 43/15; F21S 43/195; F21S 43/26; G09F 9/301

See application file for complete search history.

(56) References Cited

U.S. PATENT DOCUMENTS

| 5,043,716 | A | 8/1991 | Latz et al. |
| 6,201,316 | B1 * | 3/2001 | Knecht ............... B60R 16/0315 701/32.7 |
| 8,411,229 | B2 * | 4/2013 | Choo .................. G02B 6/0091 349/64 |
| 2015/0339845 | A1 | 11/2015 | Privsek et al. |
| 2019/0248274 | A1 * | 8/2019 | Salter .................... B60Q 1/381 |

(Continued)

FOREIGN PATENT DOCUMENTS

FR 3097936 1/2021

OTHER PUBLICATIONS

Audy et al. FR3097936A1, machine translation, 2021 (Year: 2021).*
(Continued)

*Primary Examiner* — Tracie Y Green
(74) *Attorney, Agent, or Firm* — Volpe Koenig (57) ABSTRACT

A cluster of lighting devices, a display and a method of manufacturing a display are described. The lighting device includes a mixing box, a light source, a transparent layer and a light diffusing layer. The light source is embedded in the mixing box. The transparent layer is adjacent to the light source. The light diffusing layer is adjacent to the transparent layer. A surface emitter display includes a cluster of surface emitters including a plurality of surface emitters. At least one circuit board is electrically coupled to at least one surface emitter of the plurality of surface emitters.

19 Claims, 11 Drawing Sheets

(56) References Cited

U.S. PATENT DOCUMENTS

| | | |
|---|---|---|
| 2020/0035134 A1 | 1/2020 | Pahlevaninezhad et al. |
| 2020/0408382 A1 | 12/2020 | Kleijnen et al. |
| 2021/0167047 A1 | 6/2021 | Lee |
| 2023/0417387 A1* | 12/2023 | Mülders .................. F21S 43/15 |
| 2024/0151384 A1* | 5/2024 | Chen ....................... F21V 23/06 |

OTHER PUBLICATIONS

Communication Relating to the Results of the Partial International Search mailed on Oct. 12, 2023 for PCT International Application No. PCT/US2023/026098.

International Search Report and Written Opinion mailed on Jul. 11, 2023 for PCT International Application No. PCT/US2023/016240.

* cited by examiner

CLUSTER OF LIGHTING DEVICES, DISPLAY AND METHOD OF MANUFACTURE

This application claims the benefit of U.S. Application Ser. No. 63/323,739, filed Mar. 25, 2022, which is incorporated by reference as if fully set forth.

BACKGROUND

A grille may cover an opening in the body of a vehicle to allow air to flow into and out of the opening to circulate cooling air to the vehicle's internal combustion engine to prevent overheating. The grille may also provide a visual design to the front of the car that may attract buyers and allow buyers to identify the make and model of the vehicle. For all-electric vehicles with electric motors, a grille may be obsolete and unnecessary.

SUMMARY

A cluster of lighting devices, a display and a method of manufacturing a display are described. A lighting device includes a mixing box, a light source, a transparent layer and a light diffusing layer. The light source is embedded in the mixing box. The transparent layer is adjacent to the light source. The light diffusing layer is adjacent to the transparent layer.

BRIEF DESCRIPTION OF THE DRAWINGS

A more detailed understanding can be had from the following description, given by way of example in conjunction with the accompanying drawings wherein.

DETAILED DESCRIPTION

Examples of lighting devices, displays, and methods of manufacturing will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present disclosure. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures, unless explicitly stated otherwise. It will be understood that these terms are intended to encompass different orientations of the device in addition to the orientation depicted in the figures.

Vehicular grilles may cover an opening in the body of the vehicle to provide cooling air to the engine and to provide a visual component. Electric vehicles, which have electric motors and not engines, do not require an opening in the body and a grille to provide cooling air to the engine. Instead of a grille, an electric vehicle is often left as blank canvas so to speak with no visual appeal or brand markings whatsoever. It may be desirable to make us of that blank canvas and, for example, include a display at the front of the vehicle. A display may, therefore, replace the grille for electric vehicles and may be used to communicate with other vehicles, pedestrians and/or cyclists and/or provide a visual component that may otherwise be missing from electric vehicles.

A display for electric vehicles is described herein that may include an array of lighting devices. In some embodiments, the lighting devices may be surface emitters, which may be either standalone LEDs or segments of a monolithic LED array. The terms lighting device and surface emitter may be used interchangeably herein. However, one or ordinary skill in the art will recognize that various different types of lighting devices may be used consistent with the embodiments described herein.

Conventional automotive luminaires that must cover a larger lateral area tend to have more depth and larger profiles. Creating optical display systems with low profiles that cover a large lateral area, while at the same time emitting homogeneous light, is challenging. In embodiments described herein, this may be accomplished by using scattering layers to spread the light laterally and to adapt the diffusion of the light so that a homogeneous lit surface may be created. In this way, the surface emitters in the display may provide a Lambertian dispersion of light to provide excellent conspicuity. The surface emitters may provide homogeneity as a plurality of surface emitters and as individual surface emitters. The surface emitters may have different shapes and may be controlled individually to, for example, provide different and unique displays for different makes and models of vehicles and to provide signaling to other vehicles and pedestrians. Additionally, the surface emitters may have a low profile as compared to conventional automotive luminaires, which may be an important feature at the front of the vehicle.

Figure 1:
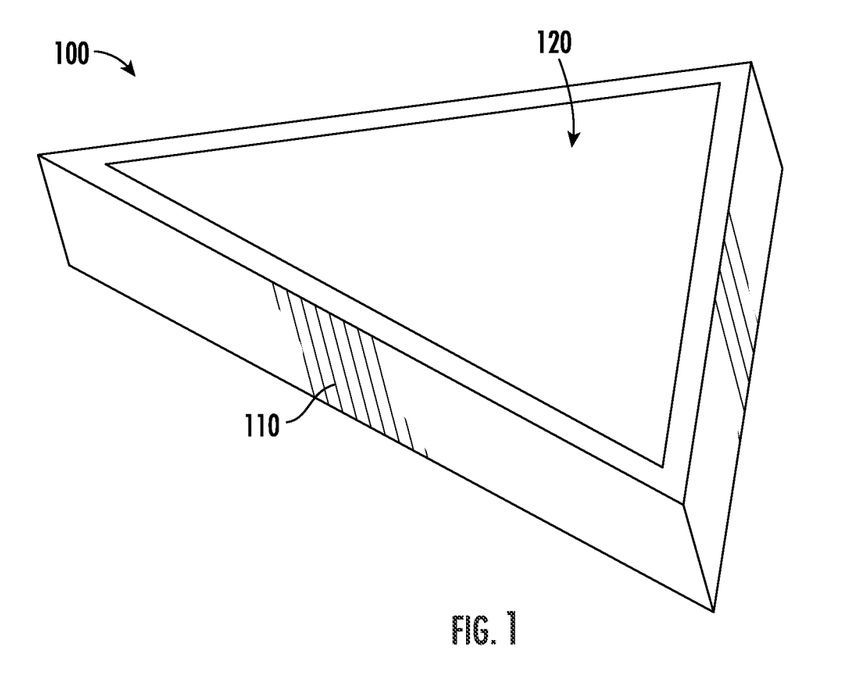
FIG. 1 is a perspective view of an example lighting device.

FIG. 1 is a perspective view of an example lighting device or surface emitter 100. The lighting device or surface emitter 100 may include a mixing box 110. Although FIG. 1 shows a mixing box 110 that is triangular in shape, the mixing box 110 may be other shapes including but not limited to rectangular, square, and circular. The mixing box 110 may be formed from silicone. The mixing box 110 may be molded into its shape. The mixing box 110 may be a white mixing box configured to recycle light and increase the light intensity by reflecting light. The lighting device or surface emitter 100 may also include an light exit surface 120. The light exit surface 120 may disperse light. The light exit surface 120 need not be planar. The mixing box 110 may be made of any flexible material, such as silicone, to allow for a degree of nonplanarity of the lighting device surface emitter 100.

Figure 2:
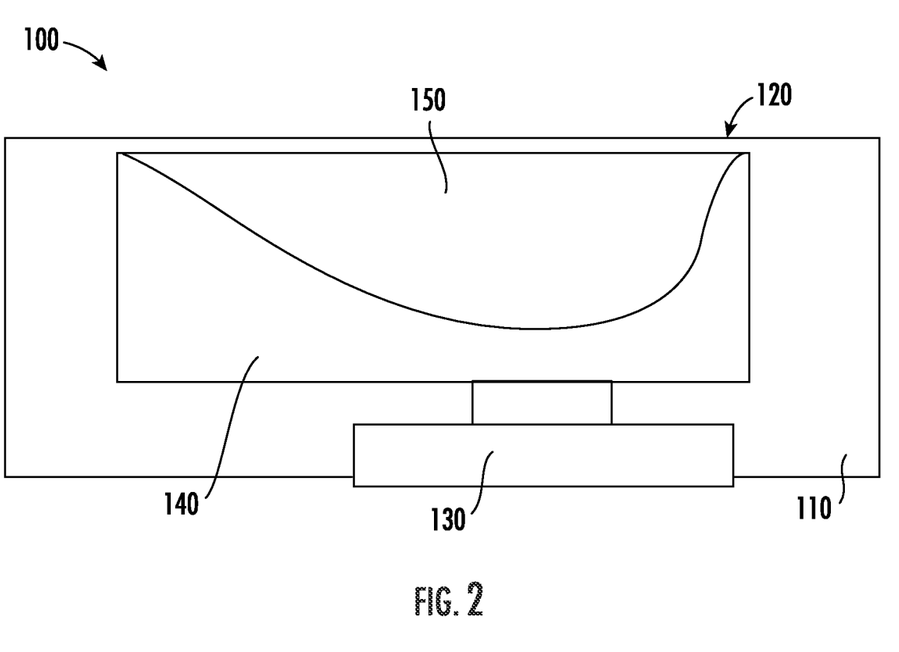
FIG. 2 is a cross-section view of the example lighting device of FIG. 1.

FIG. 2 is a cross-section view of the lighting device or surface emitter 100 of FIG. 1. The lighting device or surface emitter 100 may include the mixing box 110. The lighting device or surface emitter 100 may also include a light source 130 within the mixing box 110. The light source 130 may be or include one or more LEDs. The light source 130 may be embedded, coupled to or otherwise connected to the mixing box 110, for example, by inserting the light source 130 in an opening in a surface of the surface emitter 100 opposite the light exit surface 120. The light source 130 may be coupled to or connected to the mixing box 110 via molding or gluing. The walls of the mixing box 110 may be configured to reflect light from the light source 130 back into the mixing box 110.

The lighting device or surface emitter 100 may also include a transparent layer 140. The transparent layer 140 may be silicone. The transparent layer 140 may be adjacent to the light source 130. In some embodiments, the transparent layer 140 may be directly adjacent to the light source 130 such that there is no air gap between the light source 130 and the transparent layer 140. This may allow more light to be emitted via the light exit surface 120. The transparent layer 140 may be molded in the mixing box 110. The transparent layer 140 may laterally spread the light from the light source 130 into the mixing box 110. The transparent layer 140 may be optically coupled to the light source 130 to enhance the light extraction.

The lighting device or surface emitter 100 may also include a light diffusing layer 150. The light diffusing layer 150 may be adjacent to the transparent layer 140. The transparent layer 140 and the light diffusing layer 150 may fill the mixing box 110. The light diffusing layer 150 may be a partially transparent light scattering layer. The light diffusing layer 150 may be comprised of silicone. The light diffusing layer 150 may be comprised of transparent and white particles. The light diffusing layer may be comprised of silicone filled with $TiO_2$ particles, for example. The shape of the light diffusing layer 150 may be formed via molding or casting. The light diffusing layer 150 may adapt the lateral luminance distribution of the light from the light source 130. Because light from the light source 130 may be more intense closest to the light source 130, the light diffusing layer 150 may be thicker at locations closer to the light source 130 to laterally distribute the light from light source 130, as shown in FIG. 2. The transparent layer 140 may be thinner at locations closer to the light source 130 to accommodate the thicker locations of the light diffusing layer 150 and thicker at locations closer to the walls of the mixing box 110 to accommodate the thinner location of the light diffusing layer 150.

Alternatively, the thickness of the transparent layer 140 and the light diffusing layer 150 may each respectively have approximately the same thickness along the entire cross area of the mixing box 110. In this embodiment, the diffusing layer 150 may be less transparent at locations closer to the light source 130, where the light is more intense, and more transparent at locations closer to the walls of the mixing box 110, where the light is less intense, to uniformly distribute the light from the light source 130.

Light from the light source 130 may travel through the transparent layer 140, the light diffusing layer 150 and out the light exit surface 120 of the light diffusing layer 150. The layers 140, 150, including, for example, their color, transparency, scattering particles, shape, thickness, and location, as explained above, may enable Lambertian emission and a homogeneous appearance. The characteristics of the light diffusing layer 150 and/or the transparent layer 140, including their color, transparency, scattering particles, shape, thickness, and location, may be selected to optimize the uniformity and homogeneity of light distribution from the light source 130. The characteristics of the light diffusing layer 150 and/or the transparent layer 140 may scatter or distribute light from the light source 130 in three dimensions. The layers 140, 150 may also enable a lower profile of the surface emitter than conventional vehicular luminaires.

Figure 3:
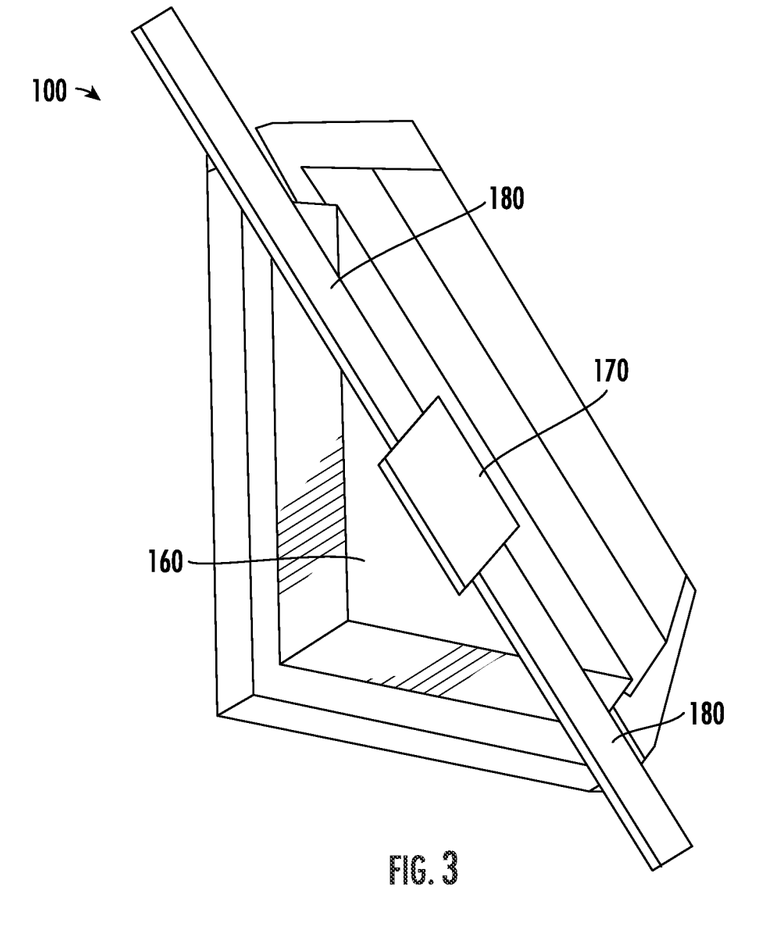
FIG. 3 is a perspective view of the example lighting device of FIGS. 1 and 2 electrically coupled to a rigid printed circuit board (PCB) and a flexible PCB.

FIG. 3 shows a back side 160 of the surface emitter 100. The back side 160 is opposite the light exit surface 120 shown in FIG. 1 and FIG. 2. The light source 130 (not visible in FIG. 3) may be mounted on and electrically coupled to a rigid printed circuit board (PCB) 170. The light source 130 may be electrically coupled to a flexible PCB 180 via soldering pins connected to the rigid PCB 170 and the flexible PCB 180. The rigid PCB 170 may protect the soldering pins against bending stress. The rigid PCB 170 and flexible PCB 180 may provide electricity to power the light source 130.

Figure 4:
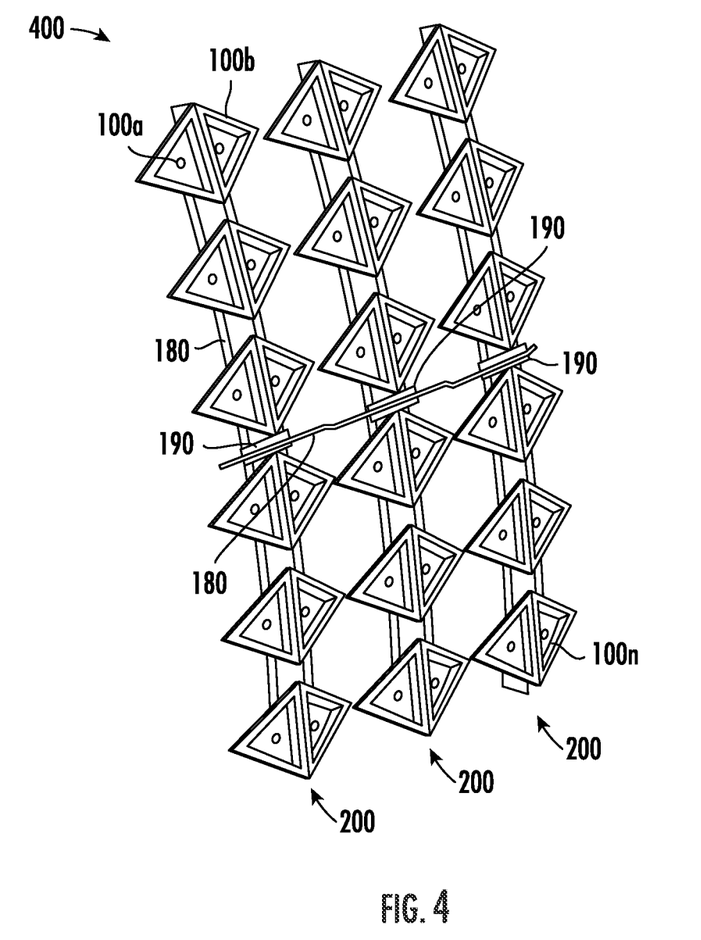
FIG. 4 is a perspective view of an example cluster of lighting devices.

FIG. 4 shows a cluster 400 of lighting devices or surface emitters 100. The cluster 400 may include a plurality of lighting devices or surface emitters 100a-n. Each lighting device or surface emitter 100 of the plurality of lighting devices or surface emitters 100a-n may be or include the details and embodiments of a lighting device or surface emitter 100 described above. The plurality of lighting devices or surface emitters 100a-n may be arranged in strings 200. Each string 200 may be connected via a flexible PCB 180. The flexibility of the PCB 180 may allow the pitch of the string 200 and/or cluster 400 to change. For example, the flexibility of the PCB 180 may allow the string 200 and/or cluster 400 to adapt to the curvature of the front of a vehicle. Each string 200 may be driven by at least one driver 190. Each driver 190 may electrically drive and control each lighting device or surface emitter 100 of the string 200 individually or may drive and control the string 200 collectively.

Figure 5:
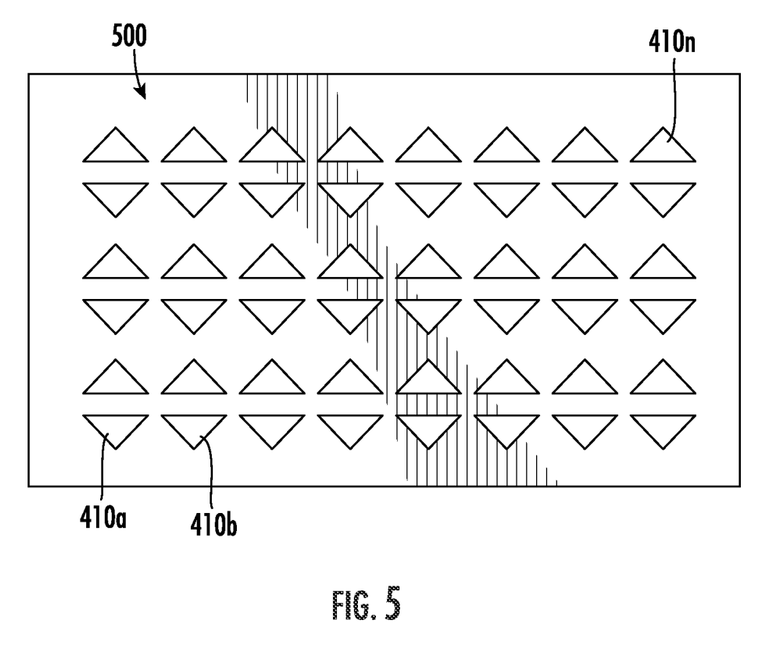
FIG. 5 is a perspective view of an example bezel.

FIG. 5 shows a bezel 500. The bezel 500 may be configured to couple to a cluster 400 of lighting devices or surface emitters 100a-n. The bezel 500 may be configured to cover a portion of each lighting device or surface emitter 100 in the cluster 400 of lighting devices or surface emitters 100a-n. The bezel 500 may be plastic, metal, or layers of these materials. As shown in FIG. 5, the bezel 500 includes a plurality of apertures 410a-n. The apertures 410a-n in the bezel 500 may be created via molding. The apertures 410a-n may be configured to align with the lighting devices or surface emitters 100a-n to allow light emitted from the lighting devices or surface emitters 100a-n to exit through the apertures 410a-n. Light exiting the apertures 410a-n may be visible to other vehicles and pedestrians. In this way, a lighting device or surface emitter display comprising the bezel 500 and a cluster 400 of lighting devices or surface emitters 100a-n on a front of a vehicle could act as day time running lights or signaling lights. The shape of the apertures 410a-n may affect the exit shape of the visible light. The shape of the apertures 410a-n may be the same shape as the mixing box 110 of the lighting device or surface emitter 100, or the shape of the aperture 410a-n may be different or unique. The entire surface adjacent the lighting devices or surface emitters 100a-n or sections of the bezel 500 may be white for reflecting the light from the light source 130 of a lighting device or surface emitter 100. By reflecting the light back into the mixing box 110, the bezel 500 may recycle the light from the light source 130 within the mixing box 110, thereby increasing the optical efficiency and making the light appear more intense.

Figure 6:
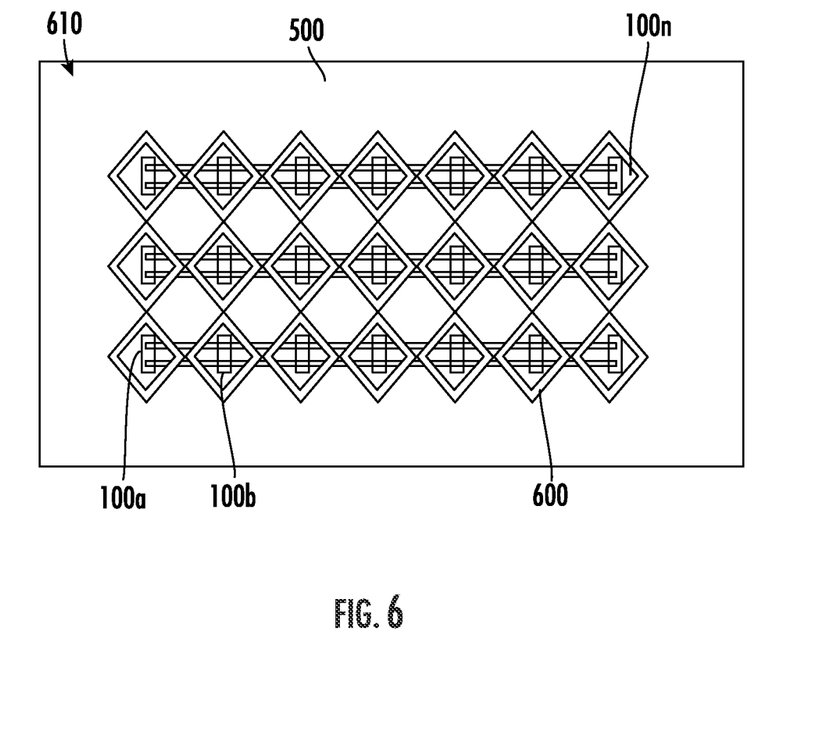
FIG. 6 is a perspective view of an example cluster of lighting devices pressed against a bezel via a grid.
Figure 7:
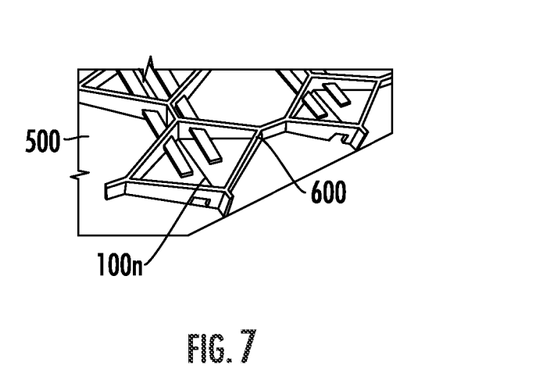
FIG. 7 is a magnified view of the example grid of FIG. 6.

FIG. 6 shows a perspective view of a surface emitter display 610. The display 610 may include a cluster 400 of lighting devices or surface emitters 100a-n coupled to the bezel 500. A grid 600 may be used to couple the cluster 400 to the bezel 500. The grid 600 may be molded from plastic. The grid 600 may be screwed or otherwise connected to the bezel 500. FIG. 7 shows a magnified view of a section of grid 600 pressing a lighting device or surface emitter 100n against the bezel 500.

Figure 8A:
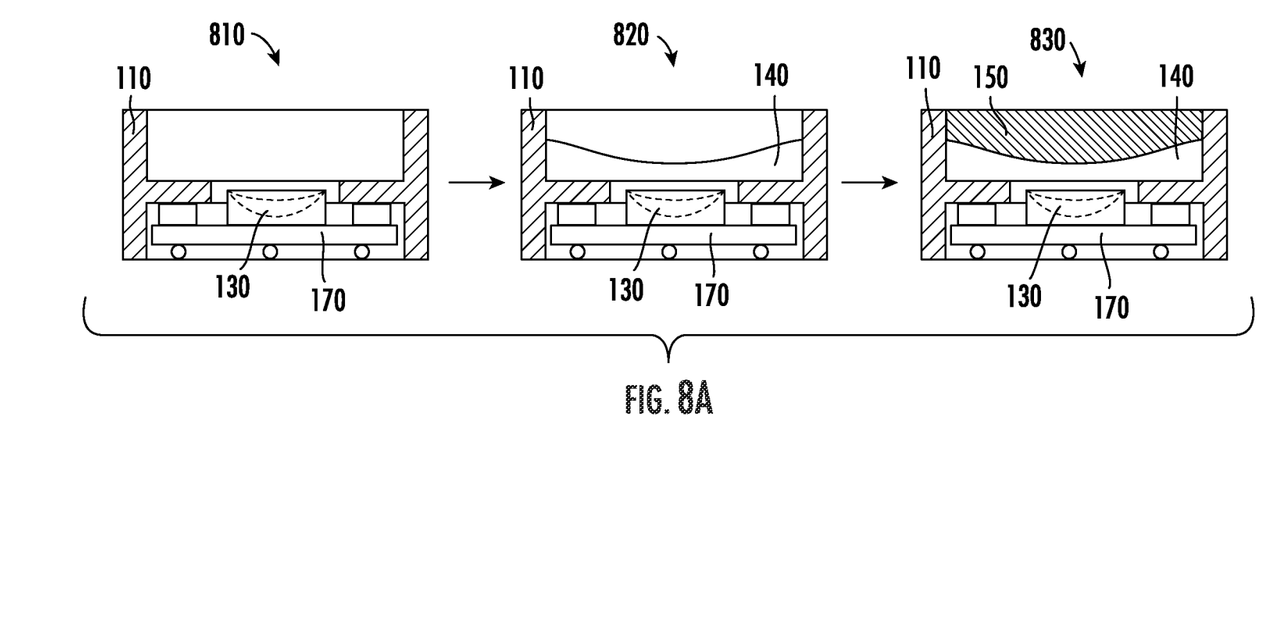
FIG. 8A is a diagram showing an example lighting device in cross-section view at various phases of a first method of manufacturing a lighting device.

FIG. 8A is a diagram showing an example lighting device or surface emitter at various phases of a first method of manufacturing a lighting device or surface emitter. In 810, the light source 130 coupled to a rigid PCB 170 may be inserted in the mixing box 110. In 820, the transparent layer 140 may be molded in the mixing box 110. The transparent layer 140 may be vacuum molded. The light source 130 may be in optical contact with transparent layer 140 with no air gap between the light source 130 and transparent layer 140. In 830, the light diffusing layer 150 may be dispensed in the mixing box 110. In some embodiments, the light diffusing layer 150 may be molded or cast to form its shape prior to being dispensed within the mixing box 110.

Figure 8B:
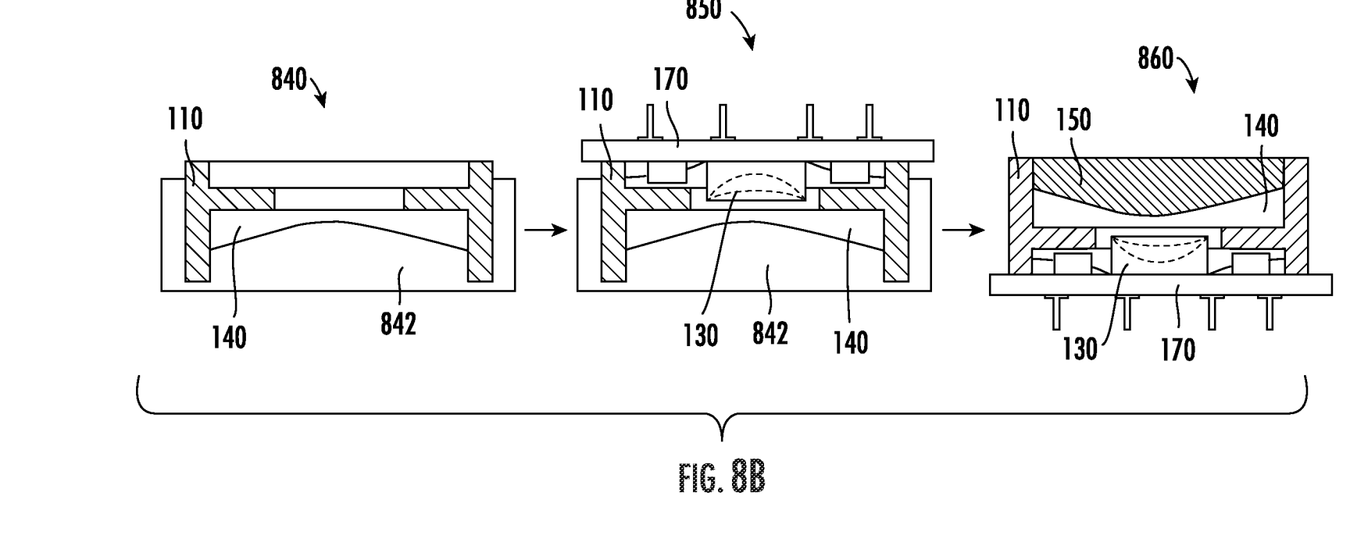
FIG. 8B is a diagram showing an example lighting device in cross-section view at various phases of a second method of manufacturing a lighting device.

FIG. 8B is a diagram showing an example lighting device at various phases of a second method of manufacturing a lighting device or surface emitter. In 840, the transparent layer 140 and the mixing box 110 are provided in a mold 842. In 850, the light source 130 coupled to the rigid PCB 170 may be inserted in the transparent layer 140 in a liquid state. The transparent layer 140 may be molded. In 860, the light diffusing layer 150 may be dispensed in the mixing box 110. In some embodiments, the light diffusing layer 150 may be molded or cast to form its shape prior to being dispensed within the mixing box 110.

Figure 9:
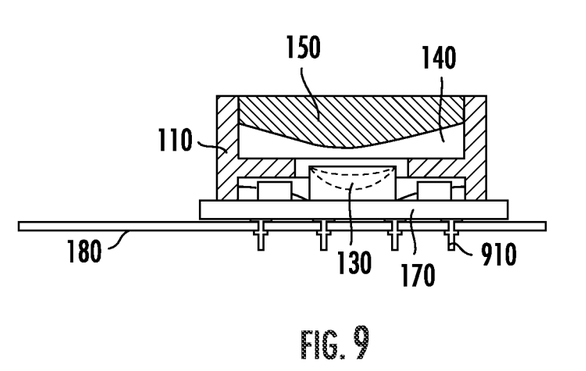
FIG. 9 is a perspective view of an example lighting device electrically coupled to a flexible PCB.

FIG. 9 is a cross-section view of a lighting device or surface emitter 100 electrically coupled to the flexible PCB 180. Pins 910 connected to the rigid PCB 170 may be connected and soldered to the flexible PCB 180. The pins 910 may be soldered to the flexible PCB 180 via wave soldering. In this way, the light source 130 may be electrically coupled to the flexible PCB 180. Each surface emitter 100 may have its own rigid PCB 170 so that each surface emitter 100 may be electrically driven and controlled individually.

Figure 10:
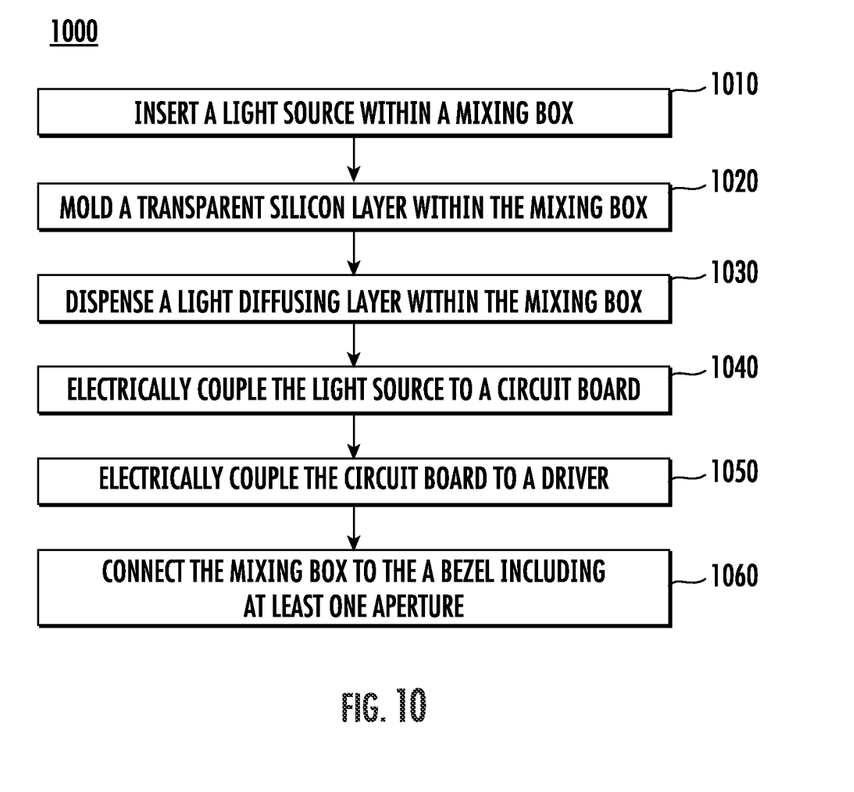
FIG. 10 is a flow chart of an example method of manufacturing a display.

FIG. 10 is a flow chart of a method of manufacturing a lighting device or surface emitter display 1000.

At 1010, a light source may be inserted within a mixing box. The mixing box may be molded. The mixing box may have, but be not limited to, a triangular, square, rectangular, or circular shape. The mixing box may have a low profile, which may be ideal or even necessary for use in a display at the front of a vehicle. The low profile of the mixing box and the lighting device or surface emitter reduces the volume and weight of the surface emitter display.

At 1020, a transparent layer may be molded within the mixing box. The transparent layer may be molded adjacent to the light source. The transparent layer encases the light source.

At 1030, a light diffusing layer may be dispensed within the mixing box. The light diffusing layer may be thicker directly above the light source and may be thinner at the outer edge towards the mixing box. The light diffusing layer, together with the transparent layer, may fill the mixing box. The transparent layer may diffuse the light laterally prior to reaching the diffusing layer. The diffusing layer may further diffuse the light. Without the transparent layer, light from the light source may diffuse too much and too quickly. The thickness variation of the light diffusing layer and the thickness of the transparent layer along with the lateral size of the mixing box may allow the transparent layer and the light diffusing layer to transmit the light from the light source homogenously and uniformly. The mixing box may reflect light from the light source back into the transparent layer and the light diffusing layer to intensify the light and to enable the light to appear homogeneous.

At 1040, the light source may be electrically coupled to at least one PCB. The at least one PCB may include a rigid PCB electrically coupled to a flexible PCB. The flexible PCB may be electrically coupled to a driver. The driver may send signals to the flexible PCB and the rigid PCB to electrically control the light source in the mixing box. Further, the driver may be communicatively coupled to a BUS system via which the driver may be controlled to control the light source in the mixing box.

Figure 11:
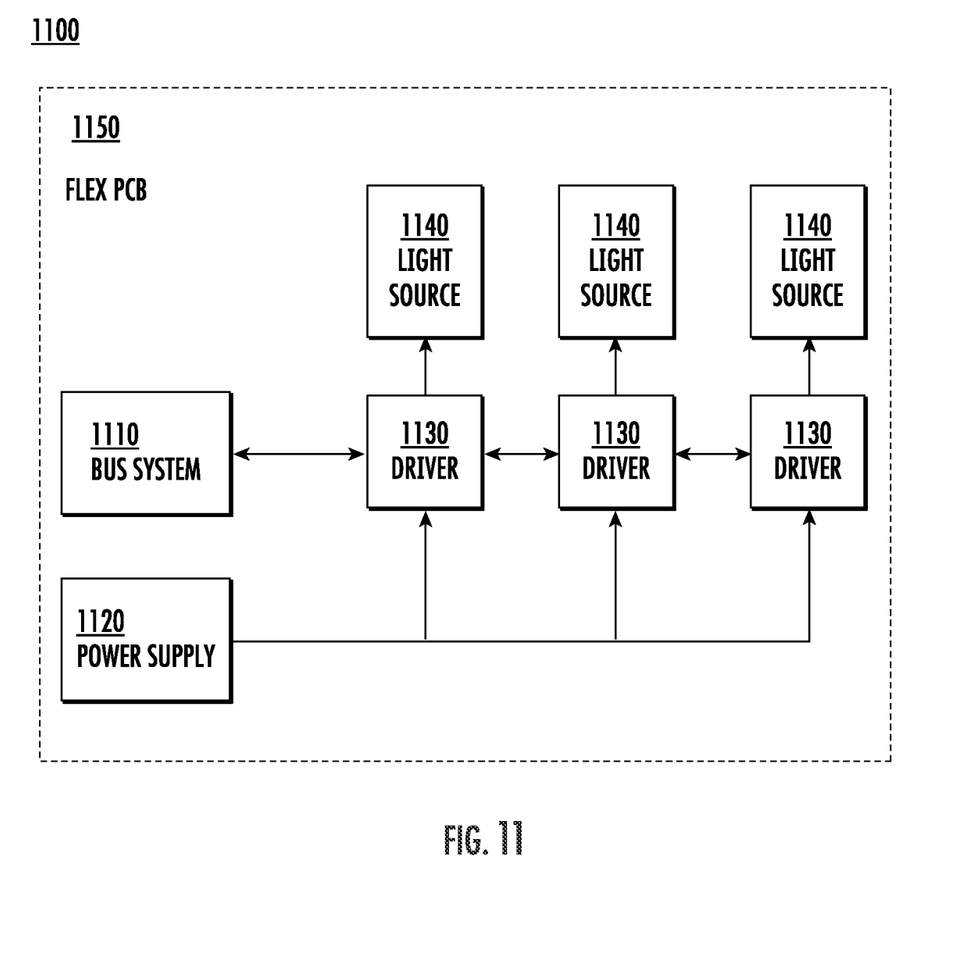
FIG. 11 is a block diagram of an example display system.

FIG. 11 is a diagram of an example lighting device or surface emitter display system 1100 that may incorporate one or more of the embodiments and examples described herein. The surface emitter display system 1100 illustrated in FIG. 11 includes a data bus system 1110, a power supply 1120, at least one driver 1130 and at least one light source 1140. Each light source 1140 may be a light source disposed within a mixing box of a lighting device or surface emitter. Although FIG. 11 shows three drivers 1130 and three light sources 1140, the surface emitter display system 1100 may include any number of drivers 1130 and light sources 1140.

The power supply 1120 may have inputs that receive power from a vehicle, and the data BUS system 1110 may have inputs/outputs over which data may be exchanged between the vehicle and the lighting device or surface emitter display system 1100. For example, the lighting device or surface emitter display system 1100 may receive instructions from other locations in the vehicle, such as instructions that the vehicle is on, the position of the vehicle, or signals that the vehicle is turning, and may send feedback to other locations in the vehicle if desired. The BUS system 1110 may provide additional data to the lighting device or surface emitter display system 1100 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). In FIG. 11, the driver 1130 may be a micro-controller. The drivers 1130 may be communicatively coupled to the BUS system 1110.

The drivers 1130 may provide a drive current to power the light source 1140 via flexible PCBs 1150. The BUS system 1110 may communicate with the drivers 1130. The drivers 1130 and BUS system 1110 may be integrated into one integrated circuit (IC). Each light source may be controlled individually or more than one light source may be controlled collectively.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A cluster of lighting devices comprising:
    a plurality of lighting devices electrically coupled together, each lighting device comprising:
        a mixing box;
        a circuit board;
        a light source embedded in the mixing box, the light source having a first surface affixed to a surface of the circuit board and a second surface opposite the first surface;
        a transparent layer having a first surface adjacent to the second surface of the light source and a second surface opposite the first surface, wherein the transparent layer is formed from a first material that spreads light emitted by the light source laterally into the mixing box; and
        a light diffusing layer having a first surface adjacent to the second surface of the transparent layer, wherein the light diffusing layer comprises a layer of the first material comprising particles of a white pigment that scatter the light emitted by the light source in three dimensions.

2. The device according to claim 1, wherein:
    the light diffusing layer is thicker directly adjacent to the light source and thinner closer to a plurality of walls of the mixing box, and
    the transparent layer is thinner directly adjacent to the light source and thicker closer to the plurality of walls of the mixing box.

3. The device according to claim 1, wherein the light diffusing layer has a uniform thickness along an entire cross area of the mixing box and is more transparent closer to a plurality of walls of the mixing box and less transparent directly adjacent to the light source to uniformly distribute the light emitted by the light source.

4. The device according to claim 1, wherein each lighting device of the plurality of lighting devices has at least one of a rectangular, square, circular, or triangular shape.

5. The device according to claim 1, wherein each lighting device of the plurality of lighting devices is configured to be individually electrically controlled.

6. A display comprising:
    a plurality of surface emitters, each surface emitter of the plurality of surface emitters comprising:
        a mixing box;
        a first circuit board;
        a light source embedded in the mixing box, the light source having a first surface affixed to a surface of the first circuit board and a second surface opposite the first surface;
        a transparent layer having a first surface adjacent to the second surface of the light source and a second surface opposite the first surface, wherein the transparent layer is formed from a first material that spreads light emitted by the light source laterally into the mixing box; and
        a light diffusing layer having a first surface adjacent to the second surface of the transparent layer, wherein the light diffusing layer comprises a layer of the first material comprising particles of a white pigment that scatter the light emitted by the light source in three dimensions;
    at least one second circuit board electrically coupled to the first circuit board of at least one surface emitter of the plurality of surface emitters; and
    a bezel including at least one aperture coupled to the plurality of surface emitters.

7. The display according to claim 6, wherein a surface of the bezel adjacent to the plurality of surface emitters is configured to reflect and recycle light from the light source back into the mixing box.

8. The display according to claim 6, wherein the first circuit board is rigid and the at least one second circuit board is flexible.

9. The display according to claim 6, further comprising at least one driver unit electrically coupled to the at least one second circuit board.

10. The display according to claim 9, further comprising a BUS system communicatively coupled to the at least one driver unit.

11. The display according to claim 6, wherein each surface emitter of the plurality of surface emitters is controlled individually.

12. The display according to claim 6, further comprising a grid configured to press the plurality of surface emitters against the bezel.

13. A method of manufacturing a lighting device display, the method comprising:
    manufacturing a lighting device by:
        affixing a first surface of a light source to a surface of a first circuit board, wherein the light source has a second surface opposite the first surface,
        inserting the light source within a mixing box,
        molding a transparent layer formed from a first material within the mixing box such that the transparent layer has a first surface adjacent the second surface of the light source and a second surface opposite the first surface and spreads light emitted by the light source laterally into the mixing box, and dispensing a light diffusing layer within the mixing box such that a first surface of the light diffusing layer is adjacent the second surface of the transparent layer, wherein the light diffusing layer comprises a layer of the first material comprising particles of a white pigment that scatter the light emitted by the light source in three dimensions; and electrically coupling more than one lighting device together.

14. The method according to claim 13, further comprising electrically coupling the light source to a second circuit board.

15. The method according to claim 14, further comprising electrically coupling the second circuit board to a driver communicatively coupled to a BUS system.

16. The method according to claim 13, further comprising connecting the more than one lighting device to a bezel including at least one aperture.

17. The device according to claim 1, wherein the particles of the white pigment are particles of Titanium Dioxide ($TiO_2$).

18. The display according to claim 6, wherein the particles of the white pigment are particles of Titanium Dioxide ($TiO_2$).

19. The method according to claim 13, wherein the particles of the white pigment are particles of Titanium Dioxide ($TiO_2$).

* * * * *